United States Patent
Gurumurthy et al.

(10) Patent No.: US 12,427,418 B2
(45) Date of Patent: Sep. 30, 2025

(54) GAMER TRAINING USING NEURAL NETWORKS

(71) Applicant: Nvidia Corporation, Santa Clara, CA (US)

(72) Inventors: Prakash Gurumurthy, Sunnyvale, CA (US); Yan Breek, Santa Clara, CA (US); Alexey Solovey, Los Gatos, CA (US); Evgeny Tumanov, Moscow (RU)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/748,975

(22) Filed: May 19, 2022

(65) Prior Publication Data

US 2022/0274018 A1 Sep. 1, 2022

Related U.S. Application Data

(63) Continuation of application No. 16/287,670, filed on Feb. 27, 2019, now Pat. No. 11,376,500.

(51) Int. Cl.
*A63F 13/5375* (2014.01)
*A63F 13/53* (2014.01)
(Continued)

(52) U.S. Cl.
CPC .......... *A63F 13/5375* (2014.09); *A63F 13/53* (2014.09); *G06F 18/2431* (2023.01);
(Continued)

(58) Field of Classification Search
CPC ....... A63F 13/5375; A63F 13/53; G06N 3/08; G06N 5/04; G06N 20/00; G06F 18/2431; G06V 10/764; G06V 10/82; G06V 20/20
See application file for complete search history.

(56) References Cited

U.S. PATENT DOCUMENTS

| | | | |
|---|---|---|---|
| 7,452,273 | B2 | 11/2008 | Amaitis |
| 8,364,612 | B2 | 1/2013 | Van Gael et al. |

(Continued)

OTHER PUBLICATIONS

Non-Final Rejection issued in U.S. Appl. No. 16/287,670 dated Jan. 25, 2021.
(Continued)

*Primary Examiner* — Reginald A Renwick
(74) *Attorney, Agent, or Firm* — Davis Wright Tremaine LLP

(57) ABSTRACT

Personalized coaching is provided to users of an application, such as players of an electronic gaming application. Data can be obtained that demonstrates how skilled users utilize an application, such as how professional players play a game. This data can be used to train a machine learning model for the game. Gameplay data for an identified player can be obtained, and related information provided as input to the trained model. The model can infer one or more actions or strategies to be taken by the player in order to achieve a determined goal. The information can be conveyed to the player using visual, audio, or haptic guidance during gameplay, or can be provided offline, such as with video or rendered replay of the game session. The types of advice or coaching given can vary depending upon factors such as the goals, skill level, and preferences of the player, and can update over time.

21 Claims, 8 Drawing Sheets

(51) Int. Cl.
    *G06F 18/2431*    (2023.01)
    *G06N 3/08*    (2023.01)
    *G06N 5/04*    (2023.01)
    *G06N 20/00*    (2019.01)
    *G06V 10/764*    (2022.01)
    *G06V 10/82*    (2022.01)
    *G06V 20/20*    (2022.01)

(52) U.S. Cl.
    CPC ............... *G06N 3/08* (2013.01); *G06N 5/04* (2013.01); *G06N 20/00* (2019.01); *G06V 10/764* (2022.01); *G06V 10/82* (2022.01); *G06V 20/20* (2022.01)

(56) References Cited

U.S. PATENT DOCUMENTS

| | | | |
|---|---|---|---|
| 8,556,706 | B2 | 10/2013 | Barney |
| 9,108,108 | B2 | 8/2015 | Zalewski |
| 9,443,192 | B1 * | 9/2016 | Cosic ..................... G06N 5/048 |
| 10,279,264 | B1 * | 5/2019 | Aghdaie .................. A63F 13/67 |
| 10,576,380 | B1 * | 3/2020 | Beltran ................... A63F 13/67 |
| 11,691,082 | B2 * | 7/2023 | Benedetto ............. A63F 13/215 |
| | | | 463/36 |
| 2001/0009867 | A1 | 7/2001 | Sakaguchi |
| 2019/0056856 | A1 * | 2/2019 | Simmons ................ G06F 3/017 |
| 2019/0065960 | A1 * | 2/2019 | Taylor .................... G06N 20/00 |

OTHER PUBLICATIONS

Non-Final Rejection issued in U.S. Appl. No. 16/287,670 dated Sep. 2, 2021.

Notice of Allowance issued in U.S. Appl. No. 16/287,670 dated Mar. 10, 2022.

* cited by examiner

GAMER TRAINING USING NEURAL NETWORKS

CROSS-REFERENCE TO RELATED APPLICATIONS

This application claims priority to and the benefit of co-pending U.S. patent application Ser. No. 16/287,670, filed Feb. 27, 2019, entitled "GAMER TRAINING USING NEURAL NETWORKS," which is hereby incorporated herein in its entirety for all purposes.

BACKGROUND

Electronic games, such as online multiplayer games, have become very popular among a wide variety of gamers. Due in part to their popularity, many of these games have become very complex and competitive. In some instances professional players, or other very highly skilled players, may come together to engage and compete in various online sessions. While this allows for very engaging and competitive gameplay, it can be at least somewhat detrimental to the enjoyment of the game by less skilled players. For example, a novice player who does not have experience with the game may get frustrated if the player is often quickly defeated in the game, and thus may stop playing. A similar issue may occur if another player is unable to get up to speed quickly enough to compete, or if teams are unable to learn strategies that help them to improve beyond a certain level. While there may be many videos posted online that gamers can watch, there is little available outside hiring professional gamers as tutors that will help them to quickly improve their skill level or game strategies for specific games or settings.

BRIEF DESCRIPTION OF THE DRAWINGS

Various embodiments in accordance with the present disclosure will be described with reference to the drawings, in which.

DETAILED DESCRIPTION

Figure 1:
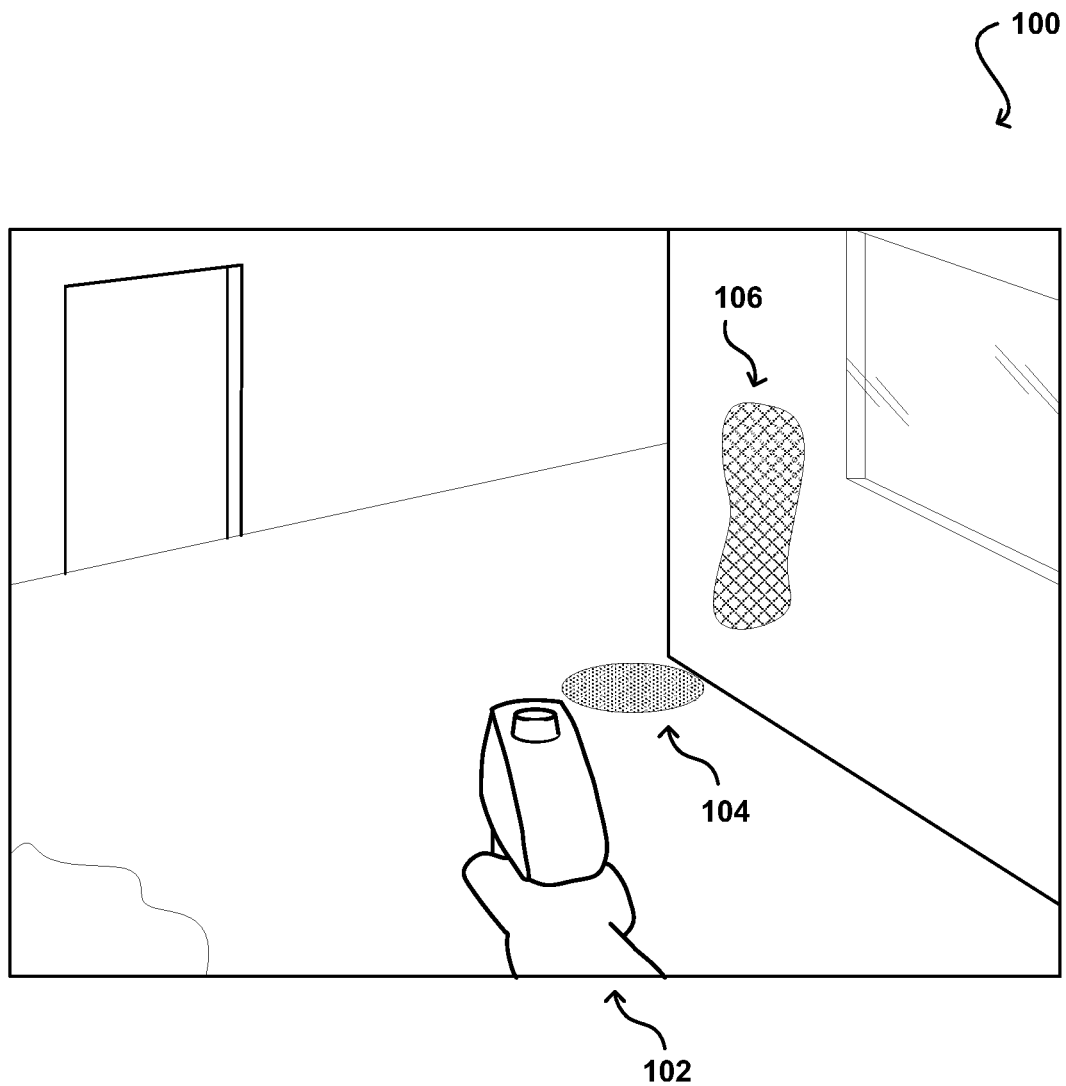
FIG. 1 illustrates an example display of gameplay content supplemented with dynamic coaching content that can be generated in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the determination of personalized advice or training for users of an application. In particular, various embodiments provide a virtual coach that can help teach, train, or improve the skills of users of an application, such as a gaming application. Data can be obtained that demonstrates how skilled users utilize an application, such as how professional players play a specific game. This data can be used to train one or more machine learning models, for example, that can then provide inferences as to actions that should be taken in the game based on that training. A specific player of the game might be new to the game, or would otherwise like to improve the player's skill level for the game. Gameplay data for that player can be obtained, either directly from the game or game server, or by analyzing game-related information such as displayed content and user input data, among other such options. Once the current state of the game is determined, a relevant trained model can be selected to generate advice for the player. Other information can be provided as input as well, as may relate to one or more goals of the player, a player type, a skill level of the player, etc. The selected model can take the input information and infer, or otherwise generate, one or more actions or strategies to be taken by the player in order to achieve a determined goal, or at least making progress toward that goal. The information can then be conveyed to the player in a way that best helps the player. This can include, for example, providing visual, audio, or haptic feedback or guidance in near real time during gameplay. For example, advice can be provided as to the recommended next action for the player to take in the game. The advice can also be provided offline, such as with video or rendered playback or replay of the game session. The types of advice or coaching given can vary depending upon factors such as the goals, skill level, and preferences of the player, and the types of advice given to a specific player can change over time as that player's skill set or preferences change.

Various other functions can be implemented within the various embodiments as well as discussed and suggested elsewhere herein.

As electronic gaming continues to develop as an industry, the diversity of gamers and skill levels develops accordingly. For online multiplayer games, many players will dedicate hundreds or thousands of hours becoming highly skilled at specific games, and may spend significant amounts of money to acquire in-game content that can help them gain further advantage over other players. Leagues of highly skilled gamers have developed, and there are many professional gamers who play e-sports competitively at very high levels. Professional gamers also monetize videos of themselves playing these games at a very high level, which other gamers or viewers can then stream for entertainment purposes.

While these developments bring publicity and new revenue streams for gaming, they have also resulted in the spread of gamer skill levels being as high as it has ever been. A downside to this spread in skill level is that it may be difficult for new, novice, or otherwise unskilled players to enjoy a game. For example, there are games where many people play in the same session with the goal of surviving to the end of a round. In such a game, it can be advantageous for all other players in the session for them to dispatch with a new player as quickly as possible. As a result, the novice player may have his in-game avatar killed very shortly after the session begins. If this happens multiple times, the player is very unlikely to want to continue playing the game. Further, if a game is difficult and the player has difficulty determining how to successfully play the game, the player may be unlikely to spend the amount of time necessary to learn. It may also be the case that a player wants to be able to improve that player's skillset to be able to compete at a higher level, and may become uninterested in the game if they are unable to improve by a desired amount or at a desired rate. Various other challenges may exist as well as discussed and suggested herein.

These challenges can lead to a number of undesirable outcomes. A first such outcome is that players will be less likely to enjoy the overall gaming experience, which can hurt the entire industry as players will play these games less. Less gameplay translates into lower revenue, which not only hurts the associated companies financially, but also results in less being spent on games, which can reduce the overall experience even for skilled or professional players, and can have players turning to other forms of entertainment. The inability to help players quickly acquire the skills to be competitive at various levels can also hurt the competition level of e-sports, for example, which can then also hurt those industries as well.

Accordingly, approaches in accordance with various embodiments attempt to provide customized training for various types of players of an electronic game or other competitive application. Although focused on gaming, it should be understood that such approaches can be used for training or coaching for other applications and situations as well, as would be apparent to one of ordinary skill in the art in light of the teachings and suggestions contained herein. In various embodiments, neural networks can be used to infer various actions, strategies, or other such decisions that can be beneficial to surface to a player. This can include, for example, displaying information as to a location where the player should move, indicating an action the player should make in the game, etc. The guidance provided can depend in part upon the state of the game that the player is currently playing, but can also depend in part upon factors such as the type of player, the skill level of the player, and/or one or more goals of the player with respect to the game. For example, guidance provided for a novice player may indicate basic moves and actions that should be taken, in order to quickly enable the player to be competitive in the game. For experienced players, the guidance may relate more to specific strategies for improvement. Further, players at the same level may have different goals, such as to complete a level as quickly as possible or to obtain all available collectables independent of the amount of time it takes, and as such may receive different training. Various other types of training or coaching can be provided as well as discussed and suggested herein.

FIG. 1 illustrates an example image 100 that may be rendered for display during a gameplay session for a particular player. This game is a three-dimensional (3D) first-person shooter-type game, which may be an online game where a player may compete against various other players of the game on the same session. As is common for such games, at least a portion of a player avatar 102 can be displayed, and gameplay can involve manipulating that avatar through a virtual 3D world to accomplish one or more goals. The player can thus provide input, such as by tapping keys of a keyboard or pressing buttons of a joypad controller, to cause the player avatar to move through the world. The player can also provide input to cause the avatar to do various things, such as to switch or fire weapons, run, crouch, jump, etc. These action options may be represented by a number of different inputs, or combinations of inputs, and these inputs can vary by game, platform, user settings, or other such factors. This can make it difficult for many novice players to quickly get up to speed with the game, as the players must not only learn the strategy of the game and figure out what to do, but must also attempt to learn the specific inputs and combinations that can trigger the desired actions. In this example where the game is a competitive game where the player also has to worry about other players trying to terminate the player from the game, by various mechanisms that can involve players using various types of weapons and tactics, the amount that the player has to learn and remember can become overwhelming, or at least cause the player to not enjoy the game as much as the player might otherwise. Thus, approaches in accordance with various embodiments can attempt to provide coaching, whether during the game or after gameplay, that can help the player more quickly get up to speed and be able to focus on fewer new concepts.

In this example, where the player is a novice player, the advice provided to the player may be very basic. For novice players, it may also be advantageous for at least some players to provide the advice dynamically and in real-time during gameplay. In the state of the game illustrated in FIG. 1, it may be desirable to provide basic strategy to the player. In this example the advice will be provided by is referred to herein as a "virtual coach." A virtual coach as used herein refers to any process or technique as discussed and suggested herein that can determine a current (or anticipated) state of a game, or other such application, can determine advice or guidance to provide to the player based on that state and information known about the player (among other such information), and can provide that information to the player in a useful way, either online or offline (or both). The virtual coach can convey the information in any appropriate way, such as through graphical or text display, haptic feedback, audio feedback, and the like. A virtual coach can be provided by various combinations of hardware and software as discussed in more detail elsewhere herein.

In the example of FIG. 1, the state of the game is analyzed and a determination made as to one or more actions that should (or at least advantageously could) be taken by a user to achieve a determined or specified goal. In the figure, a graphical representation of a location 104 in the world can be provided, such as through an overlay or rendering within the game display. This location can indicate a location to which the player should navigate his or her avatar 102, and then take another action. In some embodiments a series of actions can be determined, and these can be conveyed in a reasonable sequence of actions to be taken. In this example, it might be determined that there is, with at least some probability, a gameplay element 106 around the corner from that location 104, and the player should advantageously move to that location but then stop before continuing. This element might be a non-player character, for example, that always or often appears around the corner, and may result in some damage or negative impact to the player if the player moves beyond the location 104 without taking a separate action. In this example, the game might coach the player to move the avatar 102 to that location 104, then ready a weapon, lean around the corner, and fire at the gameplay element 106. Other actions might be provided as well, such as to wait until the gameplay element moves, jump or climb above the gameplay element, etc. In this way, the game can help to coach the player through the level, with the amount or level of coaching capable of varying based on a number of different factors. For more experienced players, the gameplay element 106 might be highlighted but no guidance given as to how to deal with that gameplay element. Similarly, if the goal is to avoid killing any gameplay elements then the advice might be to move to the indicated location 104 and move to another location after the gameplay element 106 has moved or is no longer a threat, while for a goal of finishing the level quickly the advice might be to sprint past the character while taking some amount of damage, or if the goal is to be the last surviving player then the advice might be at least one way to terminate the gameplay element 104. As mentioned, the amount of detail or instruction for each of these options may also vary based upon factors such as the skill level of the player or the level of the competition. For example, a player might be given better advice on terminating a skilled player than a novice player, in order to provide the novice player with a better chance of survival.

FIGS. 2A through 2F illustrate examples of advice or guidance that a virtual coach might provide to a gamer in accordance with various embodiments. As mentioned, the types of advice provided can depend in part upon factors such as the type of player, player skill level, player or game goal, or whether the advice is provided in a real-time or offline fashion, among other such options. In the example image 200 of FIG. 2A, a graphical overlay 202 is provided indicating that it has been determine to be advantageous for the user to consider switching to a different weapon, or equipping a different item. In this example, the advice is for the user to switch from a pistol to a grenade before progressing further along the current path. The overlay can take any of a number of different forms, including text, an image of the grenade, etc. Further, the color, transparency, size, or other aspects of the appearance may correspond to the strength of the suggestion in some embodiments. For example, if the player might benefit from a different weapon then the hint might appear as an element that is relatively faint or is slowly flashing. If it is urgent that the player switch to a different item then the item might glow red or flash quickly, etc. For novice players, the advice may include instructions on switching to the grenade, such as the next key or button to press to take that action. For more experienced players, the weapon suggestion itself may be sufficient. In some embodiments the suggestion may also be a strategic suggestion. For example, the player may have a teammate with a selected weapon, or in a position to take a first type of action. It may then be advantageous for the player to utilize the grenade in combination with the action to be taken by the teammate. For example, the grenade might be a flash grenade that the player can throw first, enabling the other player to take a different action after the flash when other players or characters might be temporarily blinded to things occurring around them.

Figure 2A:
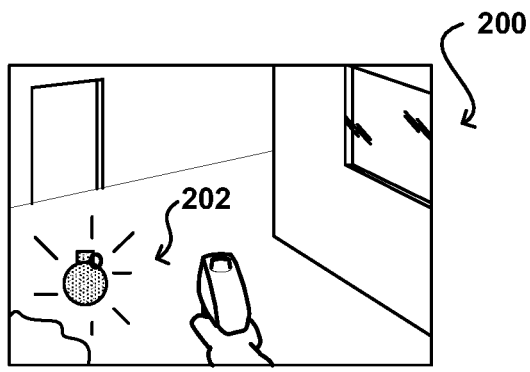
FIGS. 2A, 2B, 2C, 2D, 2E, and 2F illustrate example dynamic coaching options that can be utilized in accordance with various embodiments.
Figure 2B:
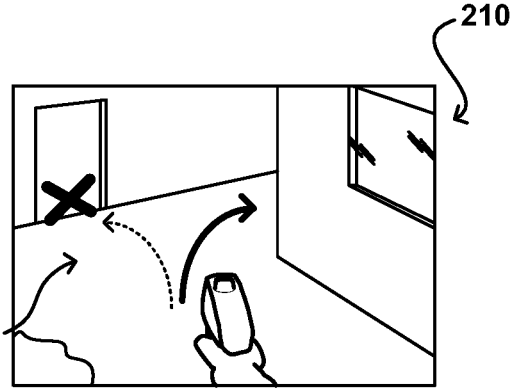

FIG. 2B illustrates another example image 210 of advice that can be provided in accordance with various embodiments. In this example, the advice indicates a path for the player to take to be more likely to obtain the determined goal. This may include providing indication of a preferred path 212 based on prior gameplay of other players. The advice may also provide indication of a path that the player may not wish to take, based on prior gameplay of other players or of the current player. For example, the player may have tried that route previously and died, causing the other path to be recommended. The recommendation may also be based on the play style of the player, as one path may require stealth and the other may require intense combat. The recommendation may also be based upon the experiences of other gamers as mentioned, with the indicated path being determined to be preferred or optimal for the determined goal. The indications can be arrows, destinations, markers, or other graphical elements. In some embodiments there may be audio or haptic feedback provided, such as when the player starts going down a path that is likely to be problematic. The player can sense the danger or risk, and can then choose to take the other path. As with most or all of the advice provided, the player can choose to follow or ignore any advice that is given. The subsequent advice given will then update or be determined based upon the actual action(s) taken by the player leading to that particular game state.

Figure 2C:
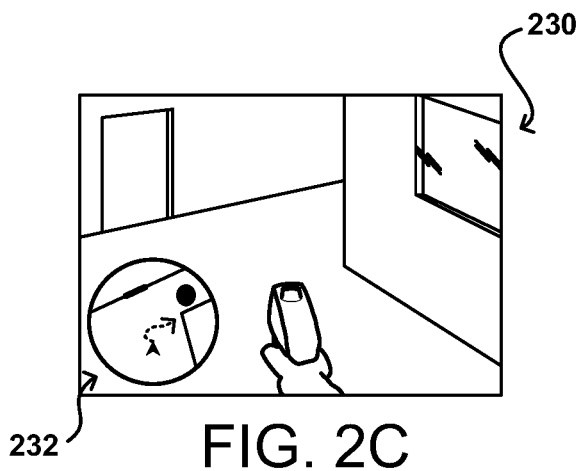

FIG. 2C illustrates another example image 230 of advice that can be provided in accordance with various embodiments. In this example, the advice is provided via a map 232 displayed to the user. The advice can take the form of an overlay over a portion of an in-game map, or the map itself may be an overlay, among other such options. In this example, the map can be used to provide information such as a route to take, predicted locations of enemies or objects, or other coaching advice. There may be various advantages to such an approach. For example, the advice displayed via the map will typically not overlay important views of the game, and thus not obstruct any important gameplay regions. Further, in some embodiments the map is only displayed when activated by the respective player, which enables the player to access advice as desired by activating the map, such as by pressing a map key, and then hiding the advice by deactivating the map. In some embodiments the map and advice might activate, update, or appear automatically when there is advice to be given, or when it is likely to be needed, such as when a player has failed to complete a task for a number of times or has been attempting a specific task for at least a minimum period of time, etc. Functionality of the map may also differ for different players. For example, in some embodiments the map may always be visible for novice players in order to continually provide advice. For more experienced players, the advice might only appear periodically, or when a particular strategy might be advantageous, etc.

In some embodiments a map view might be displayed that indicates locations of multiple players as part of a team, or who are otherwise cooperating in the game. This map view can provide the recommended actions for each player, such as the recommended path of movement, so that the players can not only coordinate strategy, but can determine the current and future locations of the players, which can help to implement the strategy. In some embodiments, the information for each player will be fed separately to a neural network in order to generate recommended paths for each. In other embodiments, the information for multiple players can be fed to the same network, which can then infer the paths or other actions for players of a team to take, which can provide for a better overall strategy since the same network is being used to determine the best set of options for an entire team to achieve the relevant goal(s). The network can also accept information for other players in the game, which can provide strategies that are determined to be successful against a particular player or type of player, etc. Strategies can also be updated as certain players are eliminated or join a game session, in order to adapt to the current game state as discussed herein.

Such an approach can also help players to provide recommendations to each other, such as if one player is coming up on a group of enemies and the other players can tell him or her to wait in position until the other players arrive. Such a map can also provide the locations of enemies or objects, such that players can decide to move to a certain area to engage those enemies or objects, or avoid that area completely.

Further, there can be different levels of actions that are provided for coaching, which can be hierarchical in some embodiments. A high level action might be a strategy for the level, while a lower level action might indicate a path of movement and a still lower level action might indicate an immediate action to take, such as to switch weapons. Different levels of actions might be provided in different ways, such as by indicating lower level actions as they should occur, while higher level actions might be presented at the beginning of a level or session, and then provided again as appropriate, such as when players are deviating from the recommended strategy or when the strategy changes. In some cases high level advice or strategy might only be provided at certain times, such as when players are selecting other players to join their team, or selecting the capabilities, weapons, or types of players to use for the game. For offline coaching, the advice could indicate how other player types or options could have been selected, and how that might have impacted gameplay.

Figure 2D:
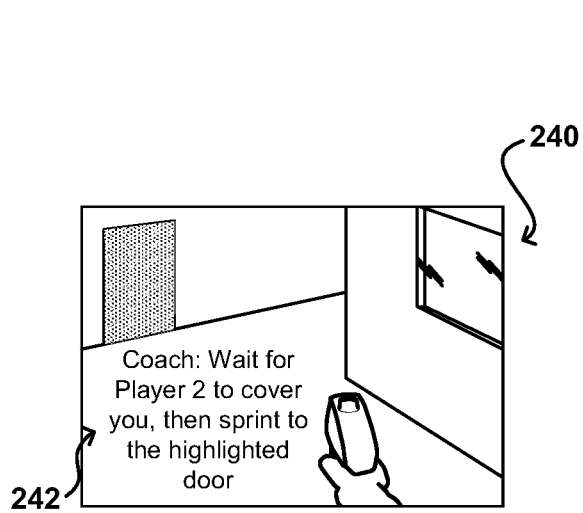

FIG. 2D provides another example image 240 providing player advice in accordance with various embodiments. In this example, textual instructions 242 are provided to the user. Because it may be difficult for a player to read long strings of text during gameplay for certain types of games, such an approach may be advantageous for offline coaching approaches that can be reviewed by a player after a game session. Such description can also be provided in-game for certain types of games, or can be provided via audio communications (such as through text-to-speech) during gameplay, so the player can receive the advice while still being able to concentrate on the game. The player in some embodiments can configure aspects of the advice, such as whether to display or communicate via audio, or a combination thereof. In some embodiments certain advice might be provided through graphical display, such as to provide an indication of a path to take or a location of an enemy character, while other types of device that might relate to strategy might better be delivered via audio communication, such as to indicate to a player that it might be advantageous to ask other members of the player's team to take specific actions. In the example, advice may be given via audio with respect to a specific door, and that door can be highlighted via a graphical overlay or other such display. As mentioned, other types of feedback such as haptics can be used as well. In embodiments that support augmented or virtual reality displays, the advice might be displayed in a certain location such that the player can access the advice as desired, but the advice will not obstruct a "forward" view of the player in game space.

Figure 2E:
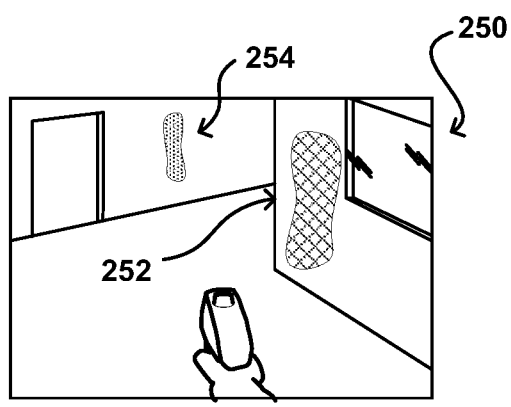
Figure 2F:
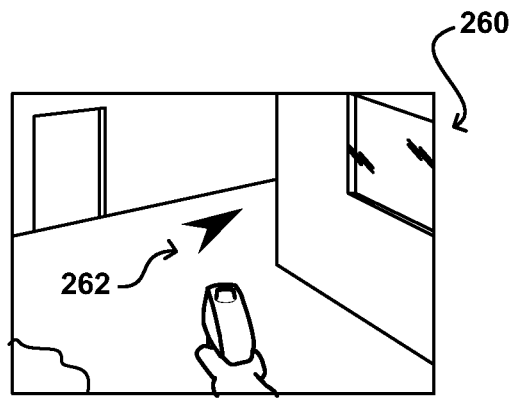

As mentioned, the advice can be used to display the determined and/or predicted locations of various types of object in the game, giving the player some extra time to determine what to do in response. For example, the image 250 illustrated in FIG. 2E illustrates the locations of two different types of gameplay elements. This might correspond to an enemy character 252 and a team member character 254. The graphical representations can use different colors, shapes, or appearances in order to differentiate between different types of objects. Text or other identifiers or differentiators can be used as well. Such an approach can not only help the player determine how to handle the upcoming enemy character 252, but can allow the player to coordinate with the nearby team member 254. If the second element 254 corresponds to a type of object, the player may be able to determine what to do about the enemy based in part upon the type of object. For example, if the object 254 is explosive then the player might decide to cause the object to explode in order to take out the enemy character 252. In this example, the advice does not instruct the player as to what to do, as might be done for a novice player, but instead just highlights various objects that may be of interest to the player, enabling the player to have more options or determine which options may be preferable for certain situations. As mentioned, in some embodiments the level of advice provided can change over time as a player gets more experienced, potentially providing less guidance or at least less granular or specific advice, except where needed or appropriate. For example, the image 260 of FIG. 2F just provides a pointer 262 overlay indicating a potentially best option to travel based on the current game state, and that overlay may only be provided periodically or upon request of the user. In some embodiments the overlay might only appear when the player is about to take one action, such as to travel in a first direction, and it is determined that a different option would be better based upon various goals or criteria, etc. Various other types of advice can be provided as well as discussed and suggested herein.

In at least some embodiments, such an approach can help to provide a machine learning- or artificial intelligence-based virtual coach, which can assist players, such as e-sports gamers, in learning and/or improving their gameplay for at least certain games. Such coaching may be particularly advantageous for online multi-player games, such as Fortnite or Counter-Strike, which attract a large number of players of different skill levels, from professional or other highly-skilled players to new or novice players who may not know even the basics of gameplay. The ability to provide a personalized virtual coach enables these different types of players to receive the personalized advice and coaching they need, improving the enjoyment of the game for all players involved. This helps to improve the overall level of competition as well, which is good for the game and the players.

As mentioned, in some embodiments a virtual agent can be embedded in a game and can function as another player in a multiplayer setting. The agent can provide advice and recommendations to help improve a human player's skills. This can be done by, for example, leading the way through a level, showing where to jump or take specific actions, showing which weapons or objects are best for certain situations, and the like. Because many games involve audio communications between players as well, the virtual agent can provide "spoken" communications to the human player as well, such as to tell the player actions to take, a strategy to follow, etc. As the player's skillset improves, the agent can go from being a leader to more of a follower, or at least equal teammate, in order to enable the player to develop leadership or other important skills. In some embodiments the player may not know that this player is a virtual agent intended to help coach or teach the player, and the virtual agent may quit "joining" in sessions once the player has reached a certain skill set, or until it is desired for the player to improve a specific skillset, etc.

As mentioned, in another embodiment the advice or coaching can be provided offline, or after an active game session. This can be similar to how a coach of a sporting team would break down game footage after the game, in order to provide advice on what could have been done better on specific plays or at specific times in the game. This can take the form of advice given through graphical, audio, textual, or other mechanisms as discussed and suggested herein, and can be provided with respect to video captured of a game session, images captured at specific points in the session, during a rendered replay of the game session, etc. A player can receive the coaching while viewing such a display of gameplay for the previous session, and in at least some embodiments can pause or replay in order to better learn specific strategies or skills. In some embodiments a player may have the option to go through a tutorial or training session for a specific skill recommended by the virtual coach. In other embodiments, a player may be able to provide input during the coaching, such as where the display is a rendered replay based on gameplay data, to determine what the likely outcome would have been for a specific action. The virtual coach may then be able to update or provide customized advice based at least in part upon the provided potential actions. In addition to actions that are specific to a gameplay state, the virtual coach can analyze the player's data over time to determine patterns or styles of player action or gameplay, and can provide suggestions for improvement based on those determined patterns or styles, which may not be specific to a particular game but may be applicable to one or more styles of games, such as first person shooters or platformers, etc.

Various embodiments can capture player data as discussed herein, then apply deep learning to determine effective actions and strategies for a particular game or type of game. This can include, for example, obtaining image or video data for a game session and using computer vision to analyze the individual images for video frames to determine actions being taken, as well as the current state of the game. If access to the actual gameplay is possible, such as through the exposed application programming interface (API) of a game server, then the actual gameplay data can be used instead (or in addition). This can be performed for data from a number of experienced or professional players, for example, such that effective strategies can be learned based on what are likely to be the most successful sessions of that game. Specific goals can be determined for the game, and effective strategies or actions learned that enable achievement of those goals. Once the strategies are learned, such as by training machine learning models using the experienced player data as discussed herein, those models can accept information about a current player and game state, and can infer specific actions or strategies to take. Information about these actions or strategies can then be provided to the player, whether during gameplay or after the session as appropriate or requested by the player. Such an approach can be used to recommend real-time strategies to help gamers get better and quickly start becoming competitive in their skills. Such an approach can work for various types of games, such as those referred to as 2D and 3D games, as well as augmented and virtual reality games. Such an approach can also be agnostic to game genre, although different models (or types of models) may be appropriate for different models, as a third person shooter may have significantly different goals or inferences than a platformer, running game, or puzzle game. Such an approach can also predict or infer inputs from a current player, as well as other players on a session, in order to help determine recommended actions and strategies to provide.

Figure 3:
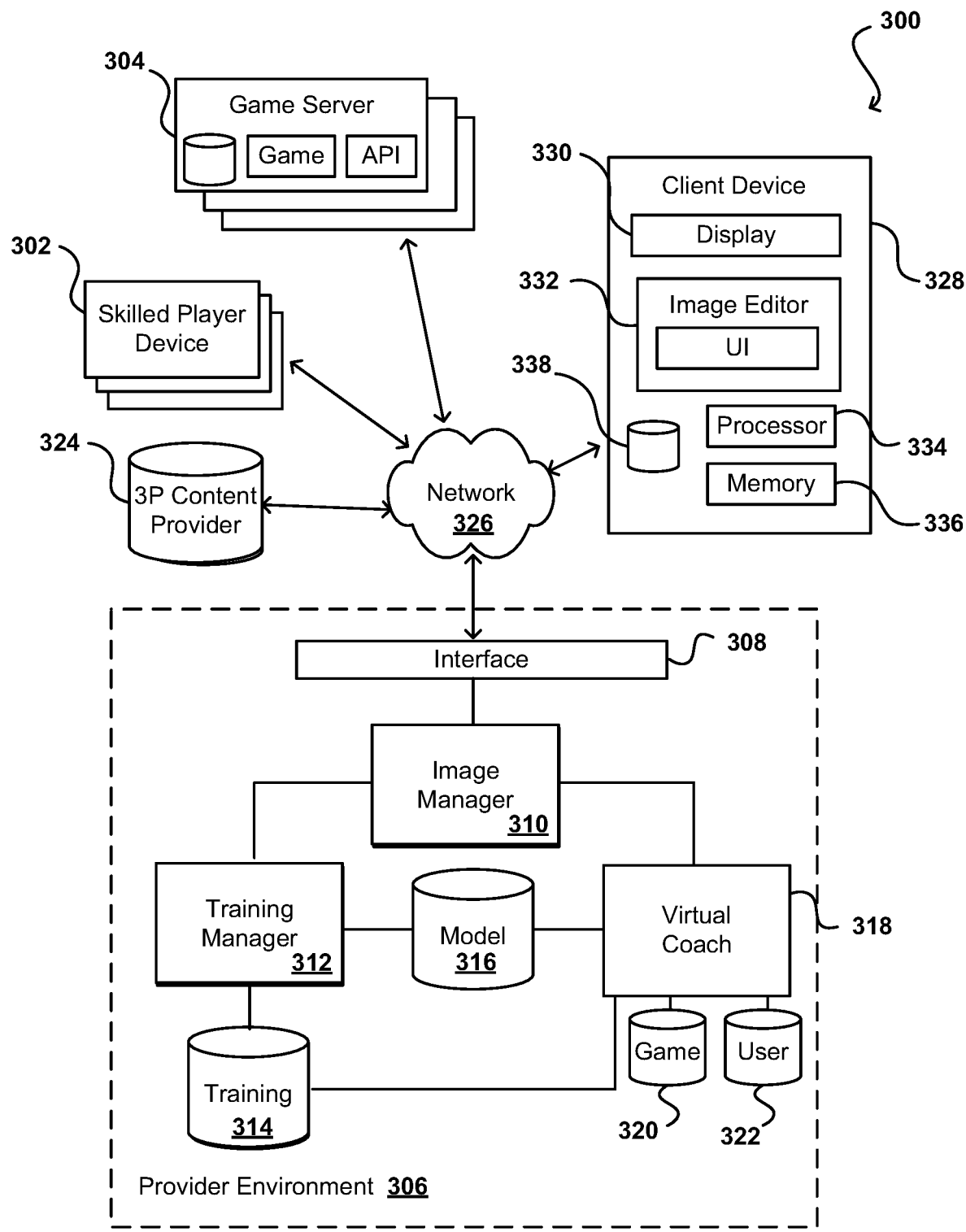
FIG. 3 illustrates an example system that can be utilized in accordance with various embodiments.

FIG. 3 illustrates components of an example system 300 that can be used to provide personalized advice in accordance with various embodiments. As will be discussed, the various components can be provided by various combinations of computing devices and resources, or a single computing system, which may be under the control of a single entity more multiple entities. Further, although gaming applications are discussed as a primary example, it should be understood that various types of applications can obtain similar benefits of personalized coaching and advice within the scope of the various embodiments.

As mentioned, it is desirable in at least some embodiments to collect gameplay data from experienced, professional, or other highly-skilled players, although in other embodiments gameplay data can be captured and utilized for players of various skill levels and types. In this example, there are a number of player devices 302 that are used by these skilled players to play sessions (or other portions of levels) a specific game application, as may be hosted locally, peer-to-peer, or on a number of game servers 304, among other such options. The player devices may be any appropriate electronic devices enabling players to participate in a particular gaming session, as may include desktop computers, notebook computers, smartphones, tablet computers, gaming consoles (portable or otherwise), and set-top boxes, among other such options. In this example, the player devices 302 communicate over at least one network 326 with at least one game server 304 in order to participate in the game session. There are various approaches for providing online gaming, and as such this will not be discussed in detail herein. The network(s) 326 can include any appropriate network for communicating gameplay data, as may include the Internet, an intranet, an Ethernet, a cellular network, a local area network (LAN), a network of directly wireless communications among peers, and the like. Gameplay data can be communicated to a provider environment 306, which may be separate from an environment including the game servers 304 in some embodiments.

The gameplay data can be received to an interface layer 308, which can forward the data to an advice manager 310. The gameplay data may be received from the game server 304 if the game server has an API or other interface exposed through which the data can be received, exported, or otherwise obtained. The data may also be received from the individual player devices 302 if there is software executing on those devices that is able to obtain and provide such data. In some embodiments the data can also come from third party sources, such as databases or streaming content providers that maintain sources 324 of video content, among other such options. The advice manager can be a system or service including hardware and software for managing the virtual coaches for various games and players. The advice manager 310 can determine that the data is gameplay data to be used for training, and can provide the data to a training manger 312. The training manager 312 can select an appropriate model or network to be used for a type of game, and can train the model using relevant training data. In some embodiments the training will wait until at least a minimum amount of gameplay data is received, as may be stored at least temporarily to a training database 314. Once a network is trained and successfully evaluated, the trained network can be stored to a model repository 316, for example, that may store different models or networks for different games, or types of games. As mentioned, in some embodiments there may be multiple models for a single game, with different models used for different goals, skill levels, types of players, and the like.

In this example, a player may utilize a player device 328 (which may also be one of the devices 302 from which training data was collected) to participate in a game session. The player may have requested or installed software for a virtual coach for the game, or the option may be provided automatically, among other such options. For such a player, information can be transmitted to the provider environment 306, although in some embodiments the trained models may be stored locally for evaluation such that no external transmission is required. The information can be transmitted as appropriate, such as periodically, at regular intervals, or at designated points or state of the game, among other such options. The data may include any relevant data, such as data representative of the current state of the game and information identifying the player, or at least information for the type and skill level of the player. The game state data can include actual gameplay data if available, or other captured data such as image an input data as discussed elsewhere herein. The data can be received to the interface layer 308 and directed to the advice manager 312. The advice manager can contact a virtual coaching module 318 or service, which can obtain the corresponding trained network, such as a trained deep neural network (DNN) as discussed herein, from the model repository 316 if not already stored locally to the virtual coach 318. The virtual coach 318 can provide the player and game data as input to the trained model, which can then infer one or more actions, inputs, directions, changes, or other such advice that should be provided to the player. The inferences can then be transmitted to the player device 328 for display or other communication to the player. If the advice is to be provided offline, the data can be stored to a game database 320 for use in generating a coaching video with the advice or providing the advice with respect to a replay of the game session, among other such options. Data for the player may also be stored to a user data repository 322, which may include data on the experience, level, and skill set of the player, which can be used to customize the advice, as well as to correlate game data stored in the game database 320. In some embodiments, the player can use account or other information to access the training data or advice from other computing or client devices as well. If permitted and available, player data may also be collected and used to further train the models, in order to provide more accurate advice for future players or sessions.

In various embodiments a processor 334 (or a processor of the training manager 312 or virtual coach 318) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

As mentioned, the player data used for training and/or coaching can be collected in a variety of different ways. For example, there may be demo or video files that are collected, posted, or otherwise provided by players. These may include video or image data, as well as player input data, which can be extracted, parsed, and analyzed to determine the appropriate training data, which can be representative of at least game state and corresponding player actions or inputs. In one embodiment the player data is run through a parser that outputs the underlying events that the player actually played, actions the player took in the game, input the user provided, etc. In some embodiments the files may be video replay files (from Twitch, YouTube, etc.) of professional human players that can be analyzed and the inputs or actions determined or inferred. In some embodiments where gameplay data is not exposed by the host or provider, a separate gameplay server (e.g., a GSI game engine server) can be configured to capture gameplay data and store that data in an appropriate way, such as to game demo files. These demo files can then be parsed to extract out the underlying events that are needed for the model. The demo files in some embodiments are replayed and the video files are converted into frames for analysis. In embodiments where the gameplay data is not available through an exposed API or other such mechanism, a stream of player input can be obtained and parsed for the relevant information. This can include determining player inputs at specific states of gameplay, or points in a gameplay session, which can be determined by analyzing the image or video data in at least some embodiments. For example, image data can be captured for frame-by-frame analysis of a gameplay session for a specific player session, and player input can be determined that can be correlated for each frame, in order to recreate the state of the game and player actions. This data can then be used as training data when obtained for the highly-skilled player, and used to determine coaching advice when determined for lesser-skilled players or players otherwise taking advantage of a virtual coach as discussed herein. The data can also be mined and analyzed to try to understand and build up strategies in at least some embodiments. As mentioned, these strategies can be hierarchical in some embodiments, with the number of levels depending in part upon the game or type of game. These might involve short-term strategies, such as where to shoot at the present time, or longer-term strategies, such as where in the map to move to, which weapons to keep, which partners to select, etc. There can be more hierarchical levels as well, as may depend on the game. One of the strategies may involve predicting the location of the nearest enemy or enemies, and then either providing assistance as to how to deal with the enemy or just providing the inferred location and allowing the player to determine the appropriate strategy. As mentioned, this information can then be provided to the user, such as through an overlay or other such indicator. The type of advice provided to the user may depend upon the skill level, goal, or preference of the user, among other such options, and may change over time as the skill and experience of the player changes.

The type of advice, or the way in which that advice is presented, may also vary by player. People learn differently, and the reactions of players to different types of advice can be monitored and used to determine how to deliver future advice. For example, some players may prefer being shown how to take an action while others might prefer to be told, or given hints and then left to figure it out themselves. Once a preference of a player is determined, the mechanism for delivering advice can attempt to utilize that preference in making coaching decisions. Further, as gameplay styles can differ between players, the identification of an area of weakness for a player may result in more coaching or advice being given for an area of weakness, with less advice being given in an area of strength. This adaptive coaching can also be preferable for many players, as they will not continue to receive coaching in areas where it is no longer needed. Combinations of deep learning and reinforcement learning can be used as appropriate. In some embodiments limitation learning can be used where data from the top players is used for training, and then the action inferences provided to players enable those player to mimic the actions of the top players as close as possible.

As mentioned, there can be different optimization goals used for a game as well. For example, one goal may be to win the game, while another goal may be to collect as many objects as possible or complete a level as quickly as possible, among other such options. There may also be different levels of goals, such as a highest level goal to win the game, with a lower level goal to eliminate as many other players as possible. There may also be different goals for different players of the same game. In some embodiments, different models may be trained and optimized for these different goals, and then used to provide advice that corresponds to those goals. Further, different optimizations may apply to different levels of players. For example, in a survival game a goal for a new player may be to simply survive as long as possible. For an experienced player, the goal may be to eliminate opponents as quickly as possible. The appropriate model can be selected and inferences determined. In some embodiments a single trained model may be used, but the goal provided as an input in order to determine the appropriate inferences.

In some embodiments the models or goals may differ based at least in part upon aspects of the players themselves. For example, there may be different goals or playing styles in different locations or cultures, and these may be accounted for in the model. Similarly, different types of players may prefer different coaching delivery styles, as different styles may resonate differently with players of different ages, genders, cultures, and the like. For example, different language might be used with a child versus an adult, or different terminology used for different cultures are appropriate.

In some embodiments, the data collected and analyzed for the players can be used for matchmaking or other purposes as well. For example, such a system or service can provide very accurate determinations of the skill level and experience of various players. This data can then potentially be used, if permitted, to determine groupings or selections of players for a session, such as where it is desired to have a variety of skill levels in a game, or where it is desired to group players of similar skill level together to avoid novice players being dominated by more skilled players, etc.

Figure 4:
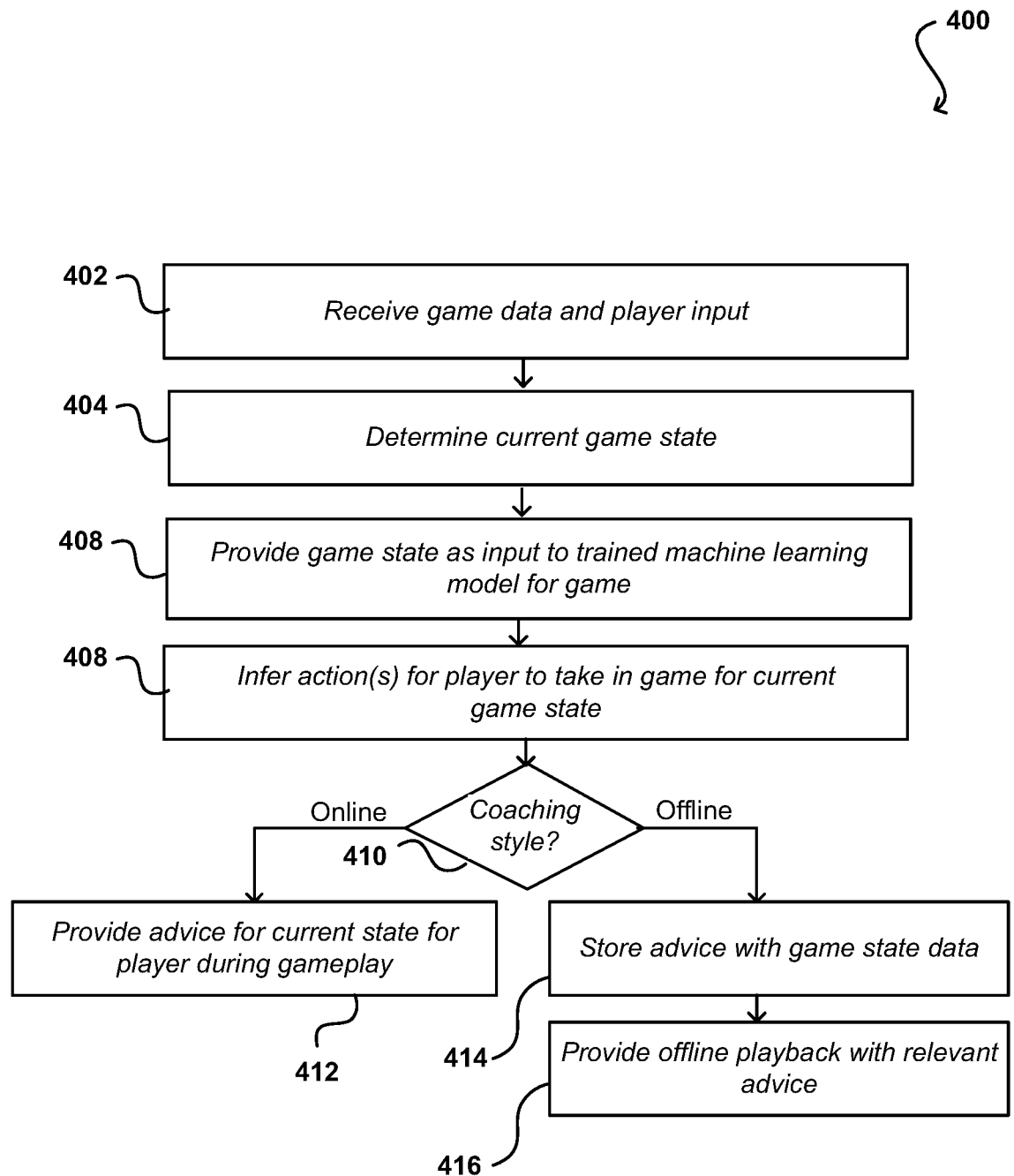
FIG. 4 illustrates a first example process for providing personalized game training that can be utilized in accordance with various embodiments.

FIG. 4 illustrates an example process 400 for providing personalized coaching for a player of a gaming application that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although gaming is provided as an example it should be understood that users of other types of applications can benefit from training and coaching techniques discussed and presented herein. In this example, game data and player input data are received 402 or otherwise obtained. This can include pulling the data from an API of a game server, if exposed, or capturing image and input data for a player session, among other such options discussed and suggested herein. A current game state can be determined 404 using this data. The game state can reflect any relevant information, such as a current location in a game world or level, current health or player state, objective accomplishment state, locations of other players or objects, recent actions of the player, and other such information. Information for the determined game state can then be provided 408 as input to a trained machine learning model for the game, where the model can have been trained using data obtained for skilled players or other such sources.

Using the trained model, one or more actions for the player to take in the game can be inferred 408 or otherwise determined. As mentioned, these can include short term actions or strategies, such as a next move to make, or longer term strategies, such as a location to which to relocate over time. The types and number of actions can be determined based on a number of factors, such as player type, goals, skill level, coaching level, and the like. A determination can be made 410 as to the type of coaching style to be used. Coaching styles can include online, real-time coaching or offline coaching, among other such options. If online coaching is to be used, advice for the current gameplay state can be provided 412 for the player, such as by using audio or visual communications, or haptic feedback, among other options discussed and suggested herein. If offline coaching is to be used, that is to be accessed outside the gaming session, then information for the advice can be stored 414 along with information for the corresponding game state. Offline playback of the game session can then be provided 416, where that playback can include presentation or conveyance of the advice at the appropriate state of the session. As mentioned, the advice can include any appropriate guidance or information that can be useful in helping the player to learn the game, get better at the game, accomplish a goal, or learn a game-relevant skill, etc.

Figure 5:
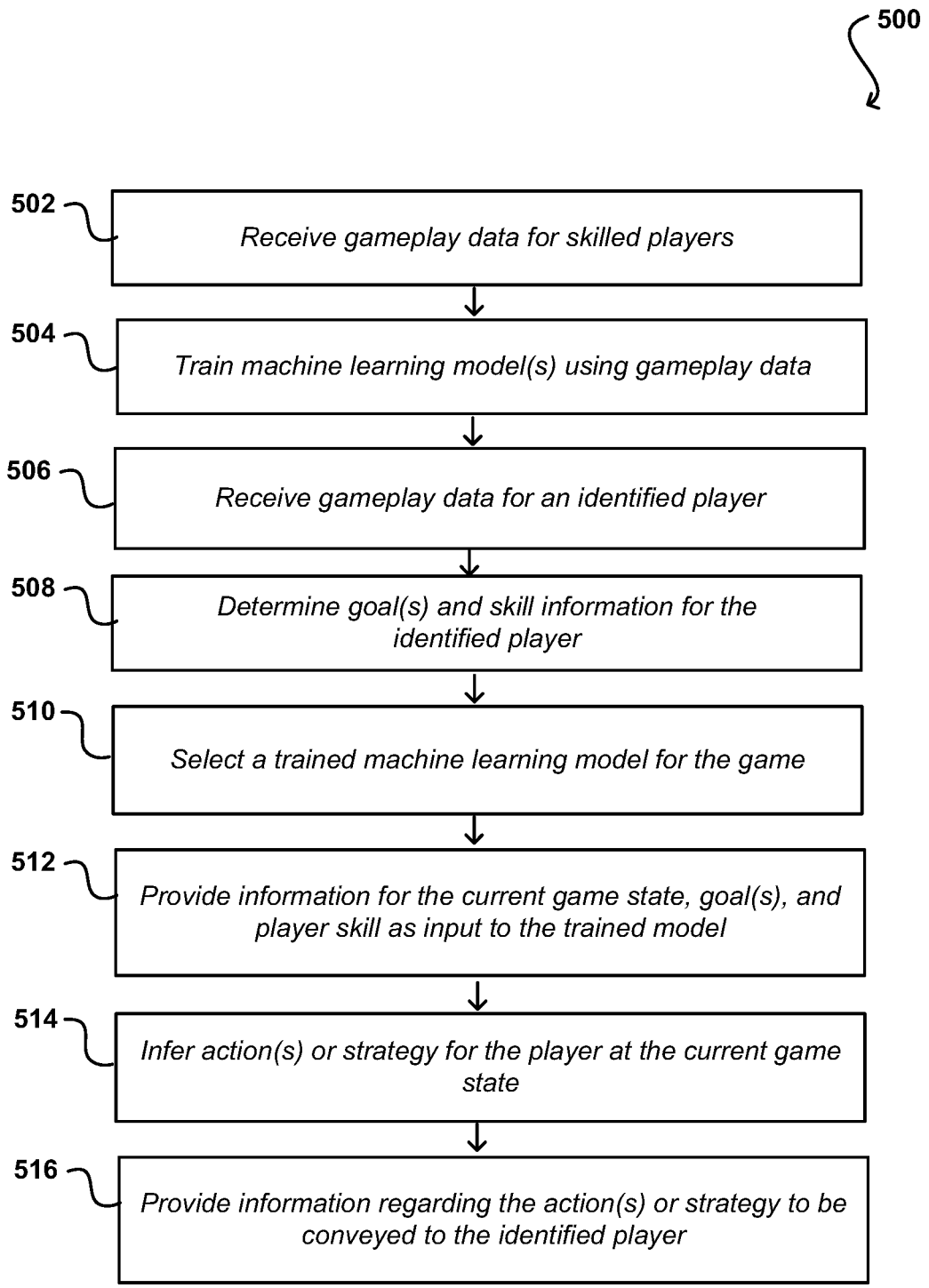
FIG. 5 illustrates a second example process for providing personalized game training that can be utilized in accordance with various embodiments.

FIG. 5 illustrates another example process 500 for providing application-specific coaching that can be utilized in accordance with various embodiments. In this example, gameplay data is received 502 or otherwise obtained for skilled players. As with the previous example, this can include obtaining actual gameplay data from a game server or application, or can include obtaining information (e.g., image and player input data) for the game that can be analyzed to determine gameplay data, among other such options. The received gameplay data can be used to train 504 one or more machine learning models for the game, where different models may be trained for different types of players, goals, or other such aspects of the game. These models can then be used to provide guidance or advice for other players of the game, or even the same players for subsequent gaming sessions.

Gameplay data can be received 506 or otherwise obtained for an identified player, such as a player having an account with a virtual coaching service. One or more goals for the player, as well as skill information and other relevant information, can be determined 508 for the identified player. The information can be pulled from a database associated with a player account, pulled from a player device, or observed during gameplay, among other such options. A trained machine learning model can be selected 510 that is relevant for the game, goals, player type or skill level, or other such information. Information for the current game state, as well as other potential information about the goals, skill level, or player type, etc., can be provided 512 as input to the trained model, where the type of input provided may depend at least in part upon the model selected. Using the model, one or more actions or strategies can be inferred 514 for the player at the current game state. These can include short and/or long term strategies and actions as discussed elsewhere herein. Information for these actions and/or strategies can then be provided 516 to the player, using online and/or offline approaches as discussed herein. In some embodiments the subsequent player actions can be captured and information for those actions and the corresponding game state used to further train the relevant model(s) for the game.

As mentioned, various embodiments take advantage of machine learning. As an example, deep neural networks (DNNs) developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including, floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 6:
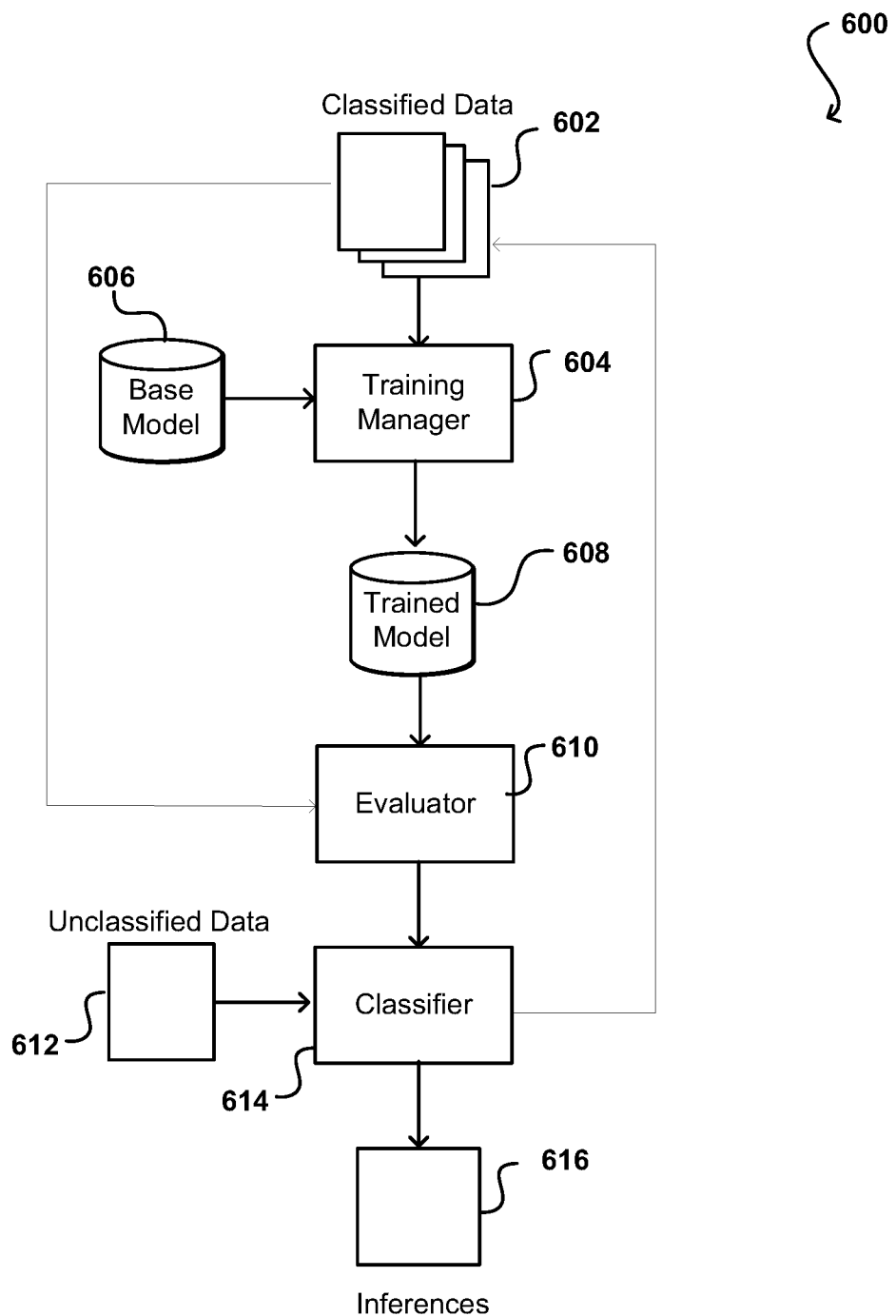
FIG. 6 illustrates an example system for training an image synthesis network that can be utilized in accordance with various embodiments.

FIG. 6 illustrates an example system 600 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 602 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 602 in this example is provided as training input to a training manager 604. The training manager 604 can be a system or service that includes hardware and software, such as one or more computing devices executing a training application, for training the statistical model. In this example, the training manager 604 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 604 can select a base model, or other untrained model, from an appropriate repository 606 and utilize the classified data 602 to train the model, generating a trained model 608 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 608 can be provided for use by a classifier 614 in classifying unclassified data 612. In many embodiments, however, the trained model 608 will first be passed to an evaluator 610, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the classified data 602 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 608 and the evaluator 610 can determine the accuracy of the model by comparing the ground truth data against the corresponding output (or predictions/observations) of the model. The evaluator 610 in some embodiments can provide a summary or performance metric indicating how well the predicted and true values match. If the trained model does not satisfy at least a minimum performance criterion, or other such accuracy threshold, then the training manager 604 can be instructed to perform further training, or in some instances try training a new or different model, among other such options. If the trained model 608 satisfies the relevant criteria, then the trained model can be provided for use by the classifier 614.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 600 of FIG. 6, the trained model 610 after evaluation is provided, or made available, to a classifier 614 that is able to use the trained model to process unclassified data. This may include, for example, data received from users or third parties that are not classified, such as query images that are looking for information about what is represented in those images. The unclassified data can be processed by the classifier using the trained model, and the results 616 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 608 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 7:
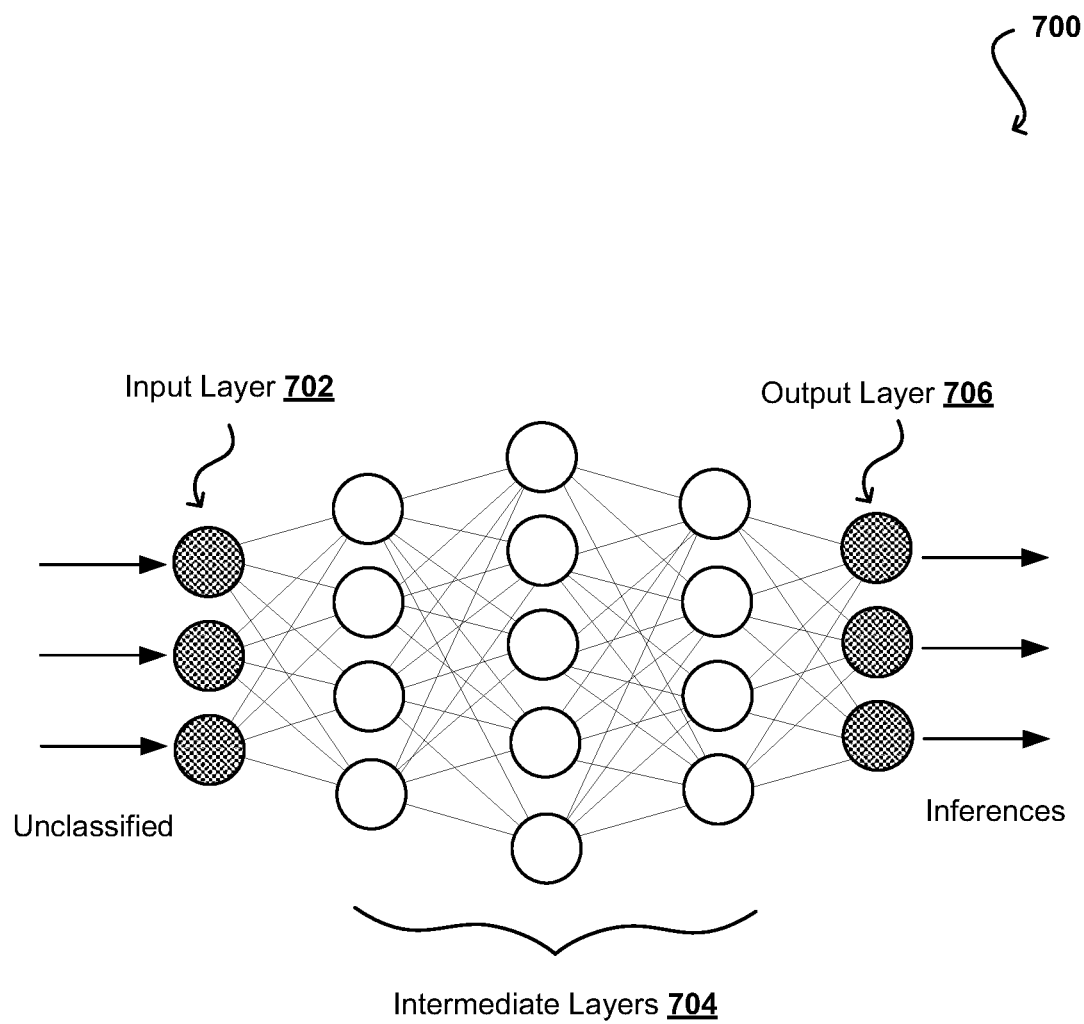
FIG. 7 illustrates layers of an example statistical model that can be utilized in accordance with various embodiments.

FIG. 7 illustrates an example neural network 700, or other statistical model, that can be utilized in accordance with various embodiments. In this example the statistical model is an artificial neural network (ANN) that includes a multiple layers of nodes, including an input layer 702, an output layer 706, and multiple layers 704 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 8:
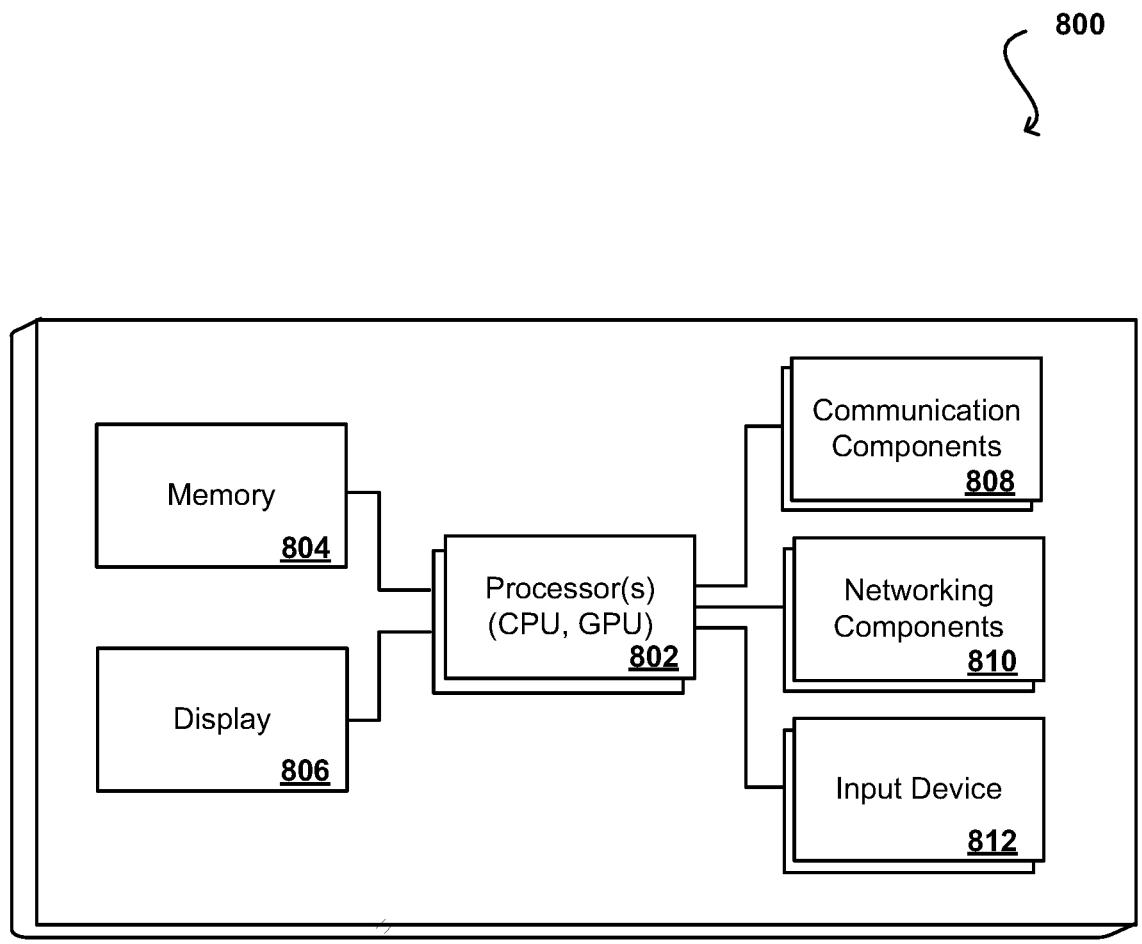
FIG. 8 illustrates example components of a computing device that can be used to implement aspects of the various embodiments.

FIG. 8 illustrates a set of basic components of a computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the processor 802, the same or separate storage can be used for images or data, a removable memory can be available for sharing information with other devices, and any number of communication approaches can be available for sharing with other devices. The device typically will include some type of display element 806, such as a touch screen, organic light emitting diode (OLED) or liquid crystal display (LCD), although devices such as portable media players might convey information via other means, such as through audio speakers. As discussed, the device in many embodiments will include at least communication component 808 and/or networking components 810, such as may support wired or wireless communications over at least one network, such as the Internet, a local area network (LAN), Bluetooth®, or a cellular network, among other such options. The components can enable the device to communicate with remote systems or services. The device can also include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. One or more processors, comprising:
    circuitry to:
        identify a skill level of a player, a state of the player, and one or more goals to be achieved by the player during gameplay;
        use one or more neural networks to:
            generate a first intermediate action to be performed by the player during gameplay based on the skill level of the player, the state of the player, and the one or more goals to be achieved by the player; and
            generate a second intermediate action to be performed by the player during gameplay based on the skill level of the player, the state of the player, the one or more goals to be achieved by the player, and the result of the player performing the first intermediate action; and
        as a result of performing the second intermediate action, indicate whether the one or more goals have been achieved by the player.

2. The processor of claim 1, wherein the circuitry is further to determine the one or more goals for the player.

3. The processor of claim 1, wherein the circuitry is further to use the one or more neural networks to:
    generate a third intermediate action to be performed by the player during gameplay based on the skill level of the player, the state of the player, the one or more goals to be achieved by the player, and the result of the player performing one or more of the first intermediate action or the second intermediate action.

4. The processor of claim 1, wherein the skill level of the player corresponds to a type of coaching to provide to the player, and the type of coaching relates to teaching a new player to play the game, increasing the skill level of a moderately skilled player, or refining a game strategy for a highly skilled player.

5. The processor of claim 1, wherein the circuitry is further to determine the state of the player in the game based, at least in part, on a series of game images and a series of player inputs.

6. The processor of claim 1, wherein one or more of the first intermediate action or the second intermediate action relate to movement of a player character, an action to be taken by the player character, or a strategy to be taken by the player character.

7. The processor of claim 1, wherein the one or more neural networks are to select the one or more neural networks based, at least in part, on the goal or the skill level of the player.

8. A computer-implemented method, comprising:
    identifying a skill level of a player, a state of the player, and one or more goals to be achieved by the player during gameplay;
    using one or more neural networks to:
        generate a first intermediate action to be performed by the player during gameplay based on the skill level of the player, the state of the player, and the one or more goals to be achieved by the player; and
        generate a second intermediate action to be performed by the player during gameplay based on the skill level of the player, the state of the player, the one or more goals to be achieved by the player, and the result of the player performing the first intermediate action; and
    as a result of performing the second intermediate action, indicating whether the one or more goals have been achieved by the player.

9. The computer-implemented method of claim 8, further comprising:
    determining the one or more goals for the player in the game.

10. The computer-implemented method of claim 8, further comprising:
    selecting the one or more neural networks, from a set of trained neural networks for the game, based at least in part upon the one or more goals.

11. The computer-implemented method of claim 8, further comprising:
    determining the skill level of the player, based on game play data of the player playing the game.

12. The computer-implemented method of claim 8, wherein the skill level of the player corresponds to a type of coaching to provide to the player, and the type of coaching relates to teaching a new player to play the game, increasing the skill level of a moderately skilled player, or refining a game strategy for a highly skilled player.

13. The computer-implemented method of claim 7, further comprising:
    determining the state of the player in the game based, at least in part, on a series of game images and a series of player inputs.

14. The computer-implemented method of claim 8, wherein one or more of the first intermediate action or the second intermediate action relate to movement of a player character, an action to be taken by the player character, or a strategy to be taken by the player character.

15. A system, comprising:
    one or more processors to use circuitry to;
        identify a skill level of a player, a state of the player, and one or more goals to be achieved by the player during gameplay;
        use one or more neural networks to:
            generate a first intermediate action to be performed by the player during gameplay based on the skill level of the player, the state of the player, and the one or more goals to be achieved by the player; and
            generate a second intermediate action to be performed by the player during gameplay based on the skill level of the player, the state of the player, the one or more goals to be achieved by the player, and the result of the player performing the first intermediate action; and
        as a result of performing the second intermediate action, indicate whether the one or more goals have been achieved by the player; and
    memory to store data corresponding to the game and parameters for the one or more neural networks.

16. The system of claim 15, wherein the circuitry is are further to determine the one or more goals for the player.

17. The system of claim 15, wherein the circuitry is further to use the one or more neural networks to:
   generate a third intermediate action to be performed by the player during gameplay based on the skill level of the player, the state of the player, the one or more goals to be achieved by the player, and the result of the player performing one or more of the first intermediate action or the second intermediate action.

18. The system of claim 15, wherein the skill level of the player corresponds to a type of coaching to provide to the player, and the type of coaching relates to teaching a new player to play the game, increasing the skill level of a moderately skilled player, or refining a game strategy for a highly skilled player.

19. The system of claim 15, wherein the circuitry is further to determine the state of the player in the game based, at least in part, on a series of game images and a series of player inputs.

20. The system of claim 15, wherein one or more of the first intermediate action or the second intermediate action relate to movement of a player character, an action to be taken by the player character, or a strategy to be taken by the player character.

21. The system of claim 15, wherein the circuitry is further to select the one or more neural networks, from a set of trained neural networks for the game, based at least in part upon the one or more goals.

* * * * *